United States Patent
Kang et al.

(10) Patent No.: US 12,399,935 B2
(45) Date of Patent: Aug. 26, 2025

(54) METHOD AND APPARATUS FOR RECOMMENDING MUSIC CONTENT

(71) Applicant: KAKAO ENTERTAINMENT CORP., Seongnam-si (KR)

(72) Inventors: Hae Na Kang, Seongnam-si (KR); Ji Hoon Chung, Seoul (KR); Yu Jin Kim, Seongnam-si (KR)

(73) Assignee: KAKAO ENTERTAINMENT CORP., Seongnam-si (KR)

( * ) Notice: Subject to any disclaimer, the term of this patent is extended or adjusted under 35 U.S.C. 154(b) by 0 days.

(21) Appl. No.: 18/550,261

(22) PCT Filed: Feb. 28, 2022

(86) PCT No.: PCT/KR2022/002856
§ 371 (c)(1),
(2) Date: Sep. 12, 2023

(87) PCT Pub. No.: WO2022/196973
PCT Pub. Date: Sep. 22, 2022

(65) Prior Publication Data
US 2024/0330364 A1    Oct. 3, 2024

(30) Foreign Application Priority Data

Mar. 19, 2021    (KR) .................. 10-2021-0036098

(51) Int. Cl.
*G06F 16/00*    (2019.01)
*G06F 16/635*    (2019.01)
(Continued)

(52) U.S. Cl.
CPC ............ *G06F 16/635* (2019.01); *G06F 16/65* (2019.01); *G06F 16/685* (2019.01)

(58) Field of Classification Search
CPC .... G06F 16/634; G06F 16/683; G06F 16/638; G06F 16/635; G06F 16/68; G06F 16/639;
(Continued)

(56) References Cited

U.S. PATENT DOCUMENTS 9,026,942 B2    5/2015  Juristovski et al.
2009/0182736 A1*  7/2009  Ghatak .................. G06Q 30/02
                                                                707/999.005
(Continued)

FOREIGN PATENT DOCUMENTS

JP    2003-271160 A    9/2003
JP    2006-268100 A    10/2006
(Continued)

OTHER PUBLICATIONS

Office Action received in JP Patent Application JP 2023-556573, dated Aug. 27, 2024, in 9 pages.
(Continued)

*Primary Examiner* — Yicun Wu
(74) *Attorney, Agent, or Firm* — Knobbe, Martens, Olson & Bear, LLP (57) ABSTRACT

A method for recommending music content is disclosed. The method for recommending music content of the present invention includes the steps of: receiving, by a recommendation apparatus, a plurality of pieces of lyrics selection information from a user terminal, wherein the lyrics selection information is information regarding some lyrics selected from lyrics of music content; generating, by the recommendation apparatus, characteristic information by analyzing at least some of the plurality of pieces of lyrics selection information; retrieving, on the basis of the characteristic information by the recommendation apparatus, at least one of pieces of recommended music content from a database; and recommending, by the recommendation apparatus, the recommended music content to the user terminal.

14 Claims, 10 Drawing Sheets

(51) Int. Cl.
*G06F 16/65* (2019.01)
*G06F 16/683* (2019.01)

(58) Field of Classification Search
CPC .. G06F 16/90324; G06F 16/65; G06F 16/632;
G06F 16/685; G11B 27/11; G11B 27/105;
G11B 27/34; G06Q 30/0631; G06Q
50/10; H04L 67/306
See application file for complete search history.

(56) References Cited

U.S. PATENT DOCUMENTS

| | | |
|---|---|---|
| 2009/0281906 A1* | 11/2009 | Cai .................... G06Q 30/0601 |
| | | 705/26.1 |
| 2017/0242861 A1* | 8/2017 | Lin ......................... G06F 16/60 |
| 2018/0357548 A1 | 12/2018 | Nichols et al. |
| 2023/0113072 A1* | 4/2023 | Labbé ..................... G10G 1/00 |
| | | 600/28 |

FOREIGN PATENT DOCUMENTS

| | | | |
|---|---|---|---|
| JP | 2008-052737 A | 3/2008 |
| JP | 2009-516252 A | 4/2009 |
| JP | 2010-262436 A | 11/2010 |
| JP | 2013-214326 A | 10/2013 |
| KR | 10-2009-0033750 A | 4/2009 |

OTHER PUBLICATIONS

International Search Report dated Jun. 17, 2022 in International Application No. PCT/KR2022/002856.

\* cited by examiner

_Somewhere over the rainbow, way up high_ — 530

There's a land that I heard of

Once in a lullabye

_Somewhere over the rainbow, skies are blue_

And the dreams that you dare to dream

Really do come true

---

Well the sky has finally opened — 540

_The rain and wind stopped blowin'_

But you're stuck out in the same ol' storm again

_You hold tight to your umbrella_

Well, darlin', I'm just tryin' to tell ya

That there's always been a rainbow hangin' over your head

METHOD AND APPARATUS FOR RECOMMENDING MUSIC CONTENT

TECHNICAL FIELD

The present invention relates to a method and apparatus for recommending music content, and more specifically, to a method and apparatus for recommending music content using lyrics of music content.

BACKGROUND

Recent music content-providing services provide a function to recommend music content suited to the user's tastes and situations. Specifically, it is a method of recommending appropriate music content according to the user's preset tastes or providing a playlist suitable for a predetermined situation.

As a more improved method for recommending music content, a method of selecting recommended music content based on a list of music content that the user has previously enjoyed has been attempted.

However, in order to provide a more sophisticated music content recommendation function, methods that reflect various information of service users are being attempted.

DETAILED DESCRIPTION OF THE INVENTION

Technical Tasks

The present invention is directed to providing a method and apparatus for recommending music content based on lyrics selected by a user.

In addition, the present invention is directed to providing a method and apparatus for generating characteristic information from a plurality of pieces of lyrics selection information and recommending music content based on this characteristic information.

Technical Solution

In a method for recommending music content of the present invention for solving the above problems, the method is performed by a recommendation apparatus, and the method includes: receiving, by the recommendation apparatus, a plurality of pieces of lyrics selection information from a user terminal, wherein the lyrics selection information is information that selects some of lyrics of music content; generating, by the recommendation apparatus, characteristic information by analyzing at least some of the plurality of pieces of lyrics selection information; retrieving, on the basis of the characteristic information by the recommendation apparatus, at least one of pieces of recommended music content from a database; and recommending, by the recommendation apparatus, the recommended music content to the user terminal.

In an embodiment of the present invention, the method may further include: generating, by the recommendation apparatus, a detailed group including at least some of the plurality of pieces of lyrics selection information, wherein in the generating characteristic information, the recommendation apparatus may generate detailed characteristic information by analyzing lyrics selection information included in the detailed group, and wherein in the retrieving, the recommendation apparatus may retrieve at least one recommended music content from the database based on the detailed characteristic information.

In an embodiment of the present invention, in the generating the detailed group, the recommendation apparatus may generate the detailed group based on classification criteria corresponding to at least one of a period including the time the lyrics selection information was generated, a situation in which the lyrics selection information was generated, a genre of the music content, a type of the music content, an artist of the music content, and a production company of the music content.

In an embodiment of the present invention, in the generating the detailed group, the recommendation apparatus may generate the detailed group based on predetermined classification criteria, and the database may be generated based on the classification criteria.

In an embodiment of the present invention, in the generating the detailed group, the recommendation apparatus may generate the detailed group by classifying the situation in which the lyrics selection information was generated based on situation criteria, and the recommending may be performed when the situation of the user terminal corresponds to the situation criteria.

In an embodiment of the present invention, in the generating the detailed group, the recommendation apparatus may generate a plurality of detailed groups, and the method may further include providing, by the recommendation apparatus, a generation result of the plurality of detailed groups to the user terminal.

In an embodiment of the present invention, when the recommendation apparatus receives information selecting one of the plurality of detailed groups from the user terminal, in the recommending, the recommendation apparatus may recommend music content based on one of the detailed groups.

In an embodiment of the present invention, the database may be generated based on a plurality of pieces of lyrics selection information received by the recommendation apparatus from other terminals.

In an embodiment of the present invention, the method may further include obtaining, by the recommendation apparatus, account information of the user terminal, and in the database, the other terminals may be selected according to the same or similar criteria predetermined based on the account information.

In an embodiment of the present invention, the method may further include receiving, by the recommendation apparatus, a request for retrieving music content from the user terminal, and preparing, by the recommendation apparatus, retrieval results including the recommended music content in response to the retrieval request, and in the recommending, the recommendation apparatus may improve and provide the exposure priority of the recommended music content while providing the retrieval results to the user terminal.

In an embodiment of the present invention, the generating characteristic information may include generating, by the recommendation apparatus, a first vector based on at least some of the plurality of pieces of lyrics selection information, and the characteristic information may be generated by reflecting the first vector, and the retrieving may include retrieving the recommended music content by comparing the first vector with a lyrics vector of the music content included in the database.

In an embodiment of the present invention, the generating characteristic information may include generating, by the recommendation apparatus, a second vector based on the situation in which the lyrics selection information was generated, and the characteristic information may be generated by reflecting the second vector together with the first vector.

In an embodiment of the present invention, the generating characteristic information may include generating, by the recommendation apparatus, a third vector based on the account information of the user terminal, and the characteristic information may be generated by reflecting the third vector together with the first vector.

An apparatus for recommending music content of the present invention for solving the above problems may include a memory; and a processor connected to the memory and configured to execute instructions contained in the memory, and the processor may control to: receive a plurality of pieces of lyrics selection information from a user terminal, wherein the lyrics selection information is information that selects some of lyrics of music content, generate characteristic information by analyzing at least some of the plurality of pieces of lyrics selection information, retrieve at least one recommended music content from a database based on the characteristic information, and recommend the recommended music content to the user terminal.

Advantageous Effects

According to the method for recommending music content of the present invention, there is an advantage in that optimal recommended music content can be retrieved and recommended based on lyrics selection information input by the user.

In addition, according to the method for recommending music content of the present invention, there is an advantage in that optimal recommended music content can be retrieved and recommended, taking into account the situation when the user selects lyrics, and so on.

DETAILED DESCRIPTION OF THE EMBODIMENTS

Hereinafter, the embodiments disclosed in this specification will be described in detail with reference to the accompanying drawings, but the same or similar components are assigned the same reference numerals regardless of reference numerals, and redundant description thereof will be omitted. In addition, in describing the embodiments disclosed in this specification, if it is determined that a detailed description of a related known technology may obscure the gist of the embodiments disclosed in this specification, the detailed description thereof will be omitted.

Terms including ordinal numbers such as first and second may be used to describe various elements, but these elements are not limited by the above-described terms. The above-described terms are used only for the purpose of distinguishing one element from another.

Expressions in the singular include plural expressions unless the context clearly indicates otherwise.

In this application, each step described can be performed regardless of the listed order, except for the case where it must be performed in the listed order due to a special causal relationship.

It is understood that the terms "comprise" or "have", when used in the present application, are intended to specify the presence of stated features, integers, steps, operations, elements, components or a combination thereof described in the specification but not preclude the possibility of the presence or addition of one or more other features, integers, steps, operations, elements, components, or a combination thereof.

Hereinafter, the present invention will be described with reference to the accompanying drawings.

Figure 1:
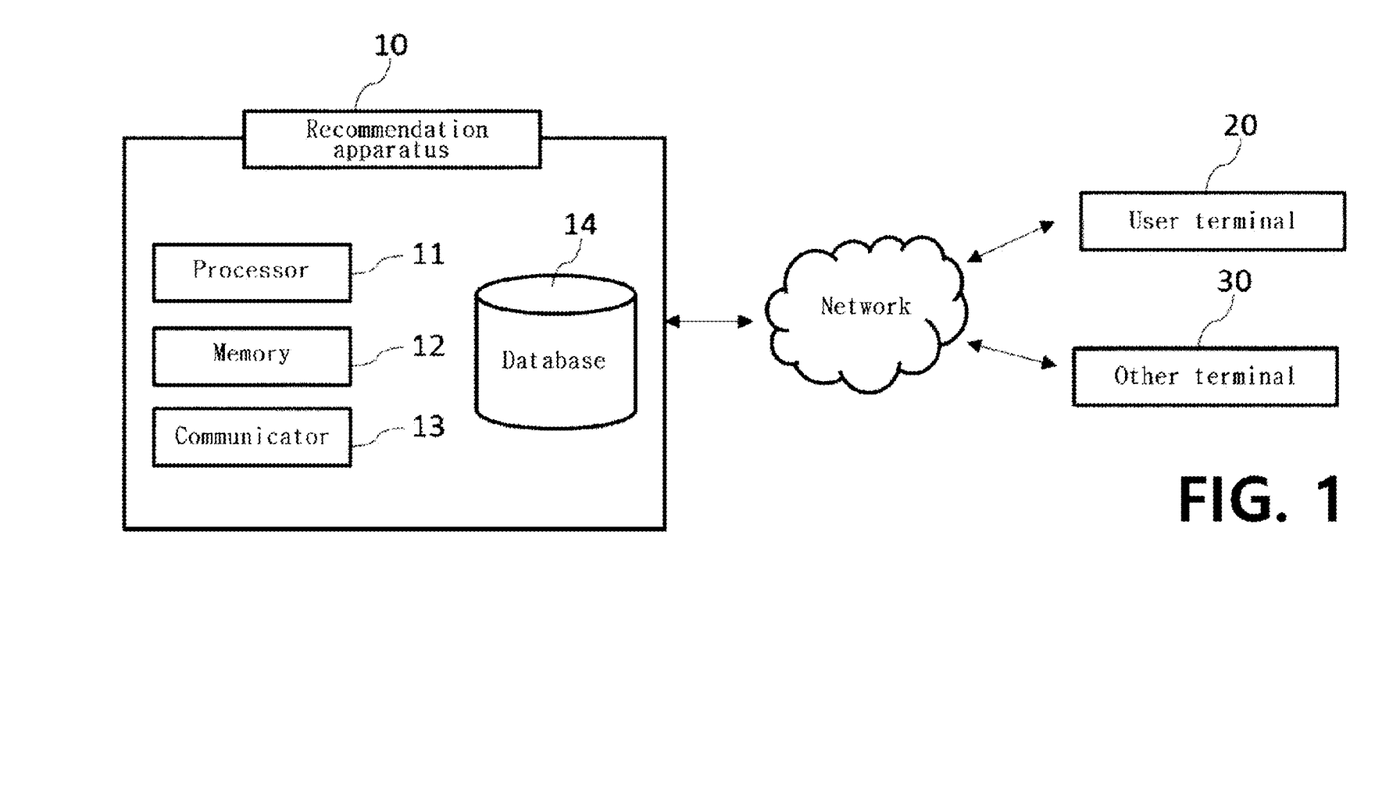
FIG. 1 is a diagram illustrating an example of a recommendation apparatus and a network environment connected thereto according to an exemplary embodiment of the present invention.

FIG. 1 is a diagram illustrating an example of a recommendation apparatus 10 and a network environment connected thereto according to an exemplary embodiment of the present invention.

In the present invention, the network is not limited in communication method, and may include not only a communication method utilizing a communication network (e.g., a mobile communication network, wired Internet, wireless Internet, and broadcasting network) that the network may include, but also short-range wireless communication.

The recommendation apparatus 10 may be implemented as a computer apparatus or a plurality of computer apparatuses that provide commands, codes, files, content, services, etc. The recommendation apparatus 10 may be a server that can transmit and receive information by communicating with a user terminal 20 and other terminals 30 over a network.

The recommendation apparatus 10 may include a memory 12, a communicator 13, and a processor 11.

The memory 12 functions as a storage medium and may store a plurality of application programs running in the recommendation apparatus 10, data and commands for operating the recommendation apparatus 10. In an embodiment, an application related to recommending music content may be stored in the memory 12.

Such memory 12 may be provided in the form of various storage devices such as ROM, RAM, flash drive, hard drive, etc. in terms of hardware, or may be provided in the form of web storage.

The communicator 13 may communicate with the user terminal 20 and other terminals 30 over a network in a wired/wireless manner.

The processor 11 may control the overall operation of the memory 12 and the communicator 13 to execute an application related to recommendation of music content. The processor 11 performs or controls to perform a method for recommending music content of the present invention, which will be described later.

The recommendation apparatus 10 may include a database 14 or may be connected to the database 14 over a network. The database 14 includes digital music or sound data that can be downloaded or streamed to the user terminal 20. The database 14 may include various information related to music content. The information related to the music content may be, for example, all information related to the sound source, such as lyrics, title, lyricist, composer, producer, artist, personal information such as the agency or age of the artist, type, genre, and popularity of the music content.

The user terminal 20 may be a fixed terminal implemented as a computer device or a mobile terminal. For example, the user terminal 20 may include a smartphone, a mobile phone, a tablet PC, a computer, a laptop computer, and personal digital assistants (PDAs), and the like. For example, the user terminal 20 may communicate with the recommendation apparatus 10 over a network using a wireless or wired communication method.

Such a user terminal 20 may be used by a user. The term "user" may refer to a user of the user terminal 20, or an account registered in a music content-providing service that is provided by the recommendation apparatus 10 or related to the recommendation apparatus 10. Therefore, when the recommendation apparatus 10 transmits certain information to the user, it may mean transmitting it to the user terminal 20 through the user's account registered in the music content-providing service.

Other terminal 30 is similar to the user terminal 20 described above. Other terminal 30 may be also a fixed terminal or a mobile terminal that is implemented as a computer apparatus. Other terminal 30 may be used by other user than the user. Other user may also be a user of other terminal 30, but may also mean an account registered with the above-described music content-providing service.

The present invention relates to a method by which a recommendation apparatus 10 recommends music content to a user terminal 20. Hereinafter, this will be described in detail.

Hereinafter, an embodiment of a method for recommending music content by the recommendation apparatus 10 of the present invention will be described with reference to FIGS. 2 and 5.

Figure 2:
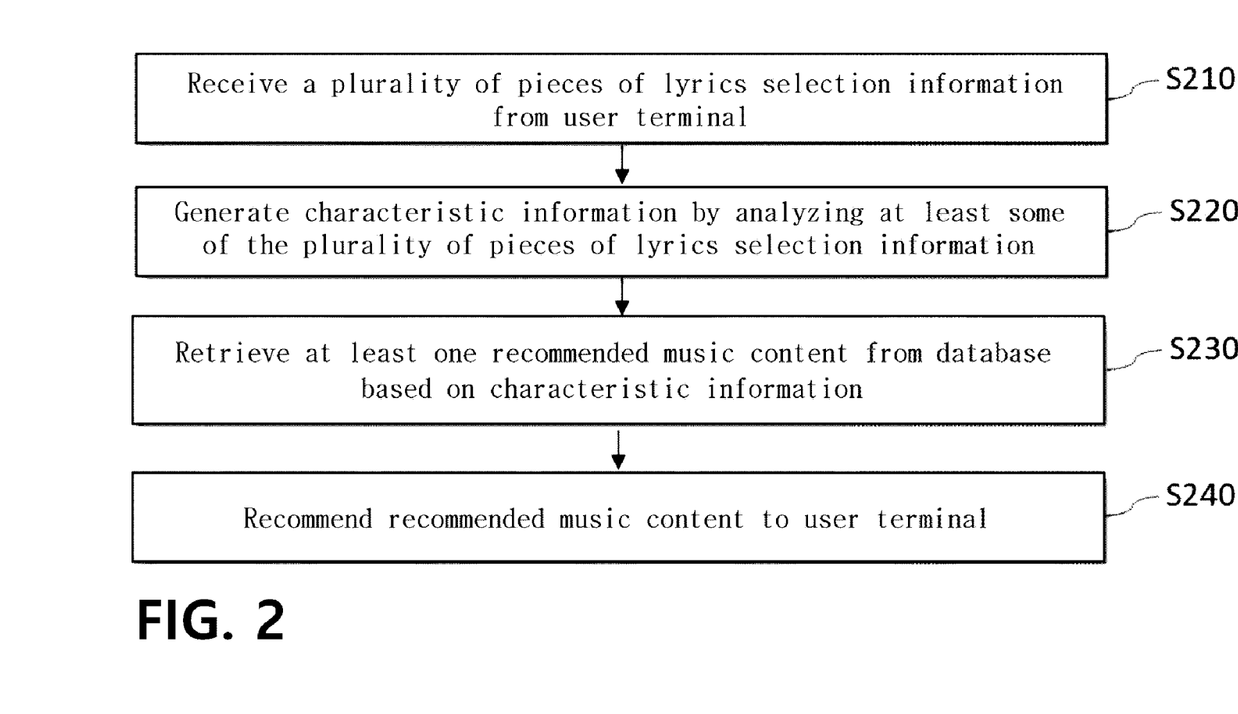
FIG. 2 is a flowchart of an exemplary embodiment of a method for recommending music content.

FIG. 2 is a flowchart of an exemplary embodiment of a method for recommending music content.

In step S210, the recommendation apparatus 10 receives a plurality of pieces of lyrics selection information from the user terminal 20.

Here, the lyrics selection information refers to information in which the user selected some of the lyrics of music content. While providing music content to the user, the user terminal 20 may provide a function to select part of the lyrics and separately designate or display it according to the user's selection. Some of the lyrics selected by the user may be a part of a word, a single word, a set of two or more words, a sentence, or a set of two or more sentences. Also, some of the lyrics selected by the user may be one or two or more parts. The user terminal 20 may provide the lyrics selection information input through this function to the recommendation apparatus 10.

The plurality of pieces of lyrics selection information may relate to a plurality of music contents. The recommendation apparatus 10 may sequentially receive and store a plurality of pieces of lyrics selection information from the user terminal 20. The recommendation apparatus may match the received pieces of lyrics selection information to the user's account information and store them.

In step S220, the recommendation apparatus 10 generates characteristic information by analyzing at least some of the plurality of pieces of lyrics selection information.

Here, the characteristic information relates to the characteristics of the lyrics selection information generated based on keywords, content, mood, type of language, and tone extracted from the plurality of pieces of lyrics selection information. For example, characteristic information may be set according to what keywords are mainly repeated in the lyrics, whether the content of the lyrics has a bright or sad mood, and so on.

The characteristic information is generated by analyzing a plurality of pieces of lyrics selection information rather than a single piece of lyrics selection information. Therefore, keywords that are commonly repeated in a plurality of pieces of lyrics selection information may be better reflected in the characteristic information than keywords that are repeated in only one piece of lyrics selection information.

In addition, characteristic information may be generated based on factors other than the lyrics themselves selected in the lyrics selection information. For example, characteristic information may be generated based on the genre, type, artist, and production company of the corresponding music content.

In addition, characteristic information may be generated by combining elements generated based on the lyrics selection information and elements other than the lyrics selection information itself. For example, the keyword rainbow may be generated as one element based on the repetition of the word "rainbow" in the lyrics, and the jazz genre may be generated as another element based on the genre of the music content being jazz. And by combining the element rainbow and the element jazz genre, one characteristic information may be generated.

Such characteristic information may be generated by specifying a characteristic keyword. For example, if the word rainbow is repeated in the lyrics of a plurality of pieces of lyrics selection information and there are many jazz genres, characteristic information may be generated as "rainbow" and "jazz."

In addition, such characteristic information may be encoded and stored. The recommendation apparatus 10 may store a plurality of pre-stored codes according to characteristic information. For example, characteristic information for the word rainbow may be stored with the code "R03K." and characteristic information for the jazz genre may be stored with the code "J03."

The recommendation apparatus 10 may generate such characteristic information, match it with the user's account information, and store it.

In step S230, the recommendation apparatus 10 retrieves at least one recommended music content from the database 14 based on the characteristic information.

The database 14 may be a music content database 14 that the recommendation apparatus 10 holds or can access. In particular, the database 14 may be a database in the form of text, such as lyrics, title, artist, and production company of music content.

The database 14 may be changed or edited in various ways. In some cases, the database 14 may reflect lyrics selection information generated by the user or other users. In other words, rather than retrieving recommended music content using all lyrics of music content as a database, recommended music content may be retrieved using only a portion of the lyrics selected by the user or other users as a database. More specifically, it is also possible to generate a database of only a portion of the lyrics selected more than a predetermined number of times. This is because the part of the lyrics of the music content selected as the lyrics selection information is likely to be a core or highlight part of the music content, and this is to reflect it in the recommendation method.

The recommendation apparatus 10 may perform a retrieval in various ways based on characteristic information. As described above, the description will be made using the example of "rainbow" and "jazz" being generated as characteristic information.

The recommendation apparatus 10 may perform a retrieval using "rainbow" itself as a retrieval keyword. However, in some cases, the recommendation apparatus 10 may expand the retrieval keyword and perform a retrieval using not only "rainbow" but also related words such as "sky" and "rainbow" as retrieval keywords.

In addition, the recommendation apparatus 10 may specify various retrieval target fields. For example, the recommendation apparatus 10 may perform a retrieval only for the lyrics of music content, or may perform a retrieval including not only the lyrics but also the title and artist of the music content.

In addition, the recommendation apparatus 10 may select the intersection of retrieval results using "rainbow" and "jazz" as the final retrieval result, or select the union as the final retrieval result. In some cases, the final retrieval result may be selected by giving different weights to "rainbow" and "jazz."

Through this retrieval, the recommendation apparatus 10 may select at least one recommended music content in step S230.

In step S240, the recommendation apparatus 10 recommends recommended music content to the user terminal 20.

The recommendation apparatus 10 may perform recommendation by prioritizing retrieval results derived in step S230 by considering retrieval accuracy, similarity, etc. In addition, recommendation priorities can be determined by reflecting the popularity of music content, user account information (for example, taste information entered by the user), etc.

Figure 3:
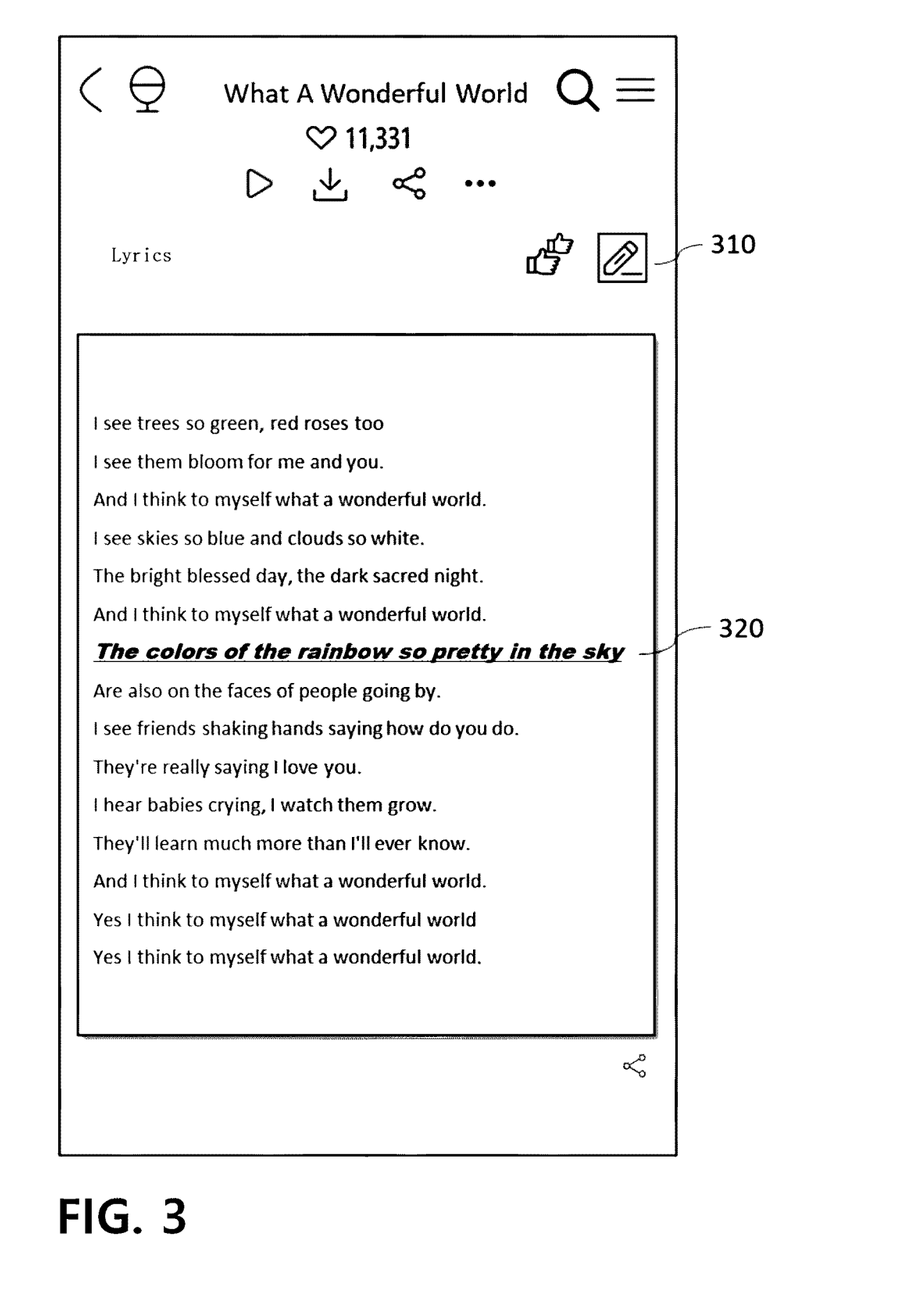
FIG. 3 shows an example of a screen of a user terminal on which lyrics selection information is displayed.

FIG. 3 shows an example of a screen of a user terminal 20 on which lyrics selection information is displayed.

As shown in FIG. 3, lyrics of music content are displayed on the screen of the user terminal 20. A selection interface 310 that can activate a mode for selecting lyrics may be provided on the screen of the user terminal 20. When the mode for selecting lyrics is activated, the user may select lyrics through interactions such as touching, clicking, or dragging part of the lyrics on the screen. And, some 320 of the lyrics selected by the user may be displayed to be distinguished from other parts.

Figure 4:
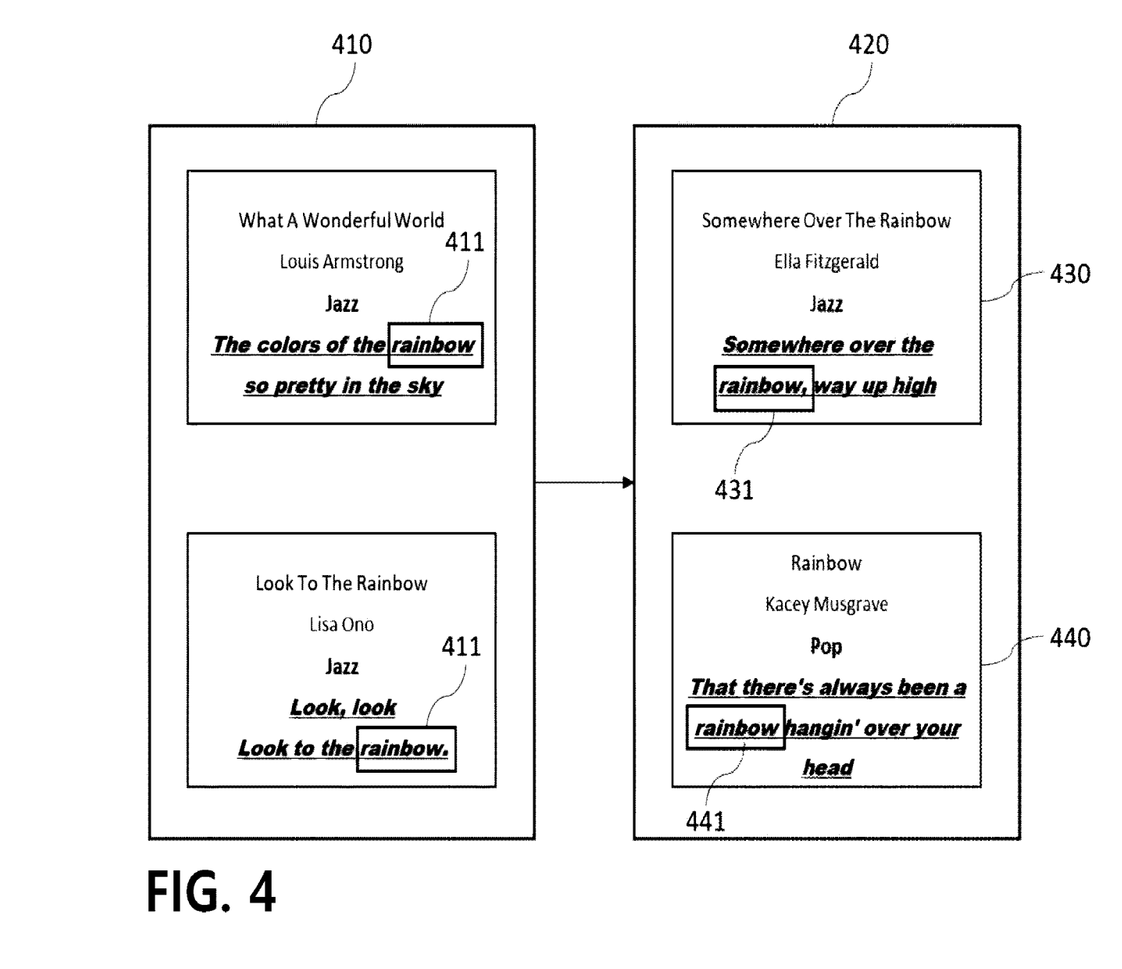
FIG. 4 shows an example of a step in which a recommendation apparatus retrieves recommended music content.

FIG. 4 shows an example of a step S230 in which a recommendation apparatus 10 retrieves recommended music content.

As shown in FIG. 4, there may be two pieces of lyrics selection information 410. The two pieces of lyrics selection information include the word "rainbow" in common. And the music contents of the two pieces of lyrics selection information are all in the jazz genre.

In this case, the recommendation apparatus 10 may perform a retrieval using the "rainbow" keyword as characteristic information and obtain the first and second music contents 430 and 440 as retrieval results. Both the retrieved first and second music contents 430 and 440 include the word "rainbow" in the lyrics. The recommendation apparatus 10 may recommend both the first and second music contents 430 and 440 to the user terminal 20 in step S240.

In some cases, the recommendation apparatus 10 may additionally reflect characteristic information indicating that the genre is jazz to the first and second music contents 430 and 440. In this case, the recommendation apparatus 10 may preferentially recommend the first music content 430 in step S240. For example, this is a method of exposing the first music content 430 at a higher position than the second music content 440 on the recommendation result screen of the user terminal 20.

In addition, in some cases, the recommendation apparatus 10 may perform a retrieval using both the "rainbow" keyword and the jazz genre as characteristic information, and select only the music content corresponding to the intersection as the recommended music content. In this case, the recommendation apparatus 10 may recommend only the first music content 430 to the user terminal 20 in step S240.

Figure 5:
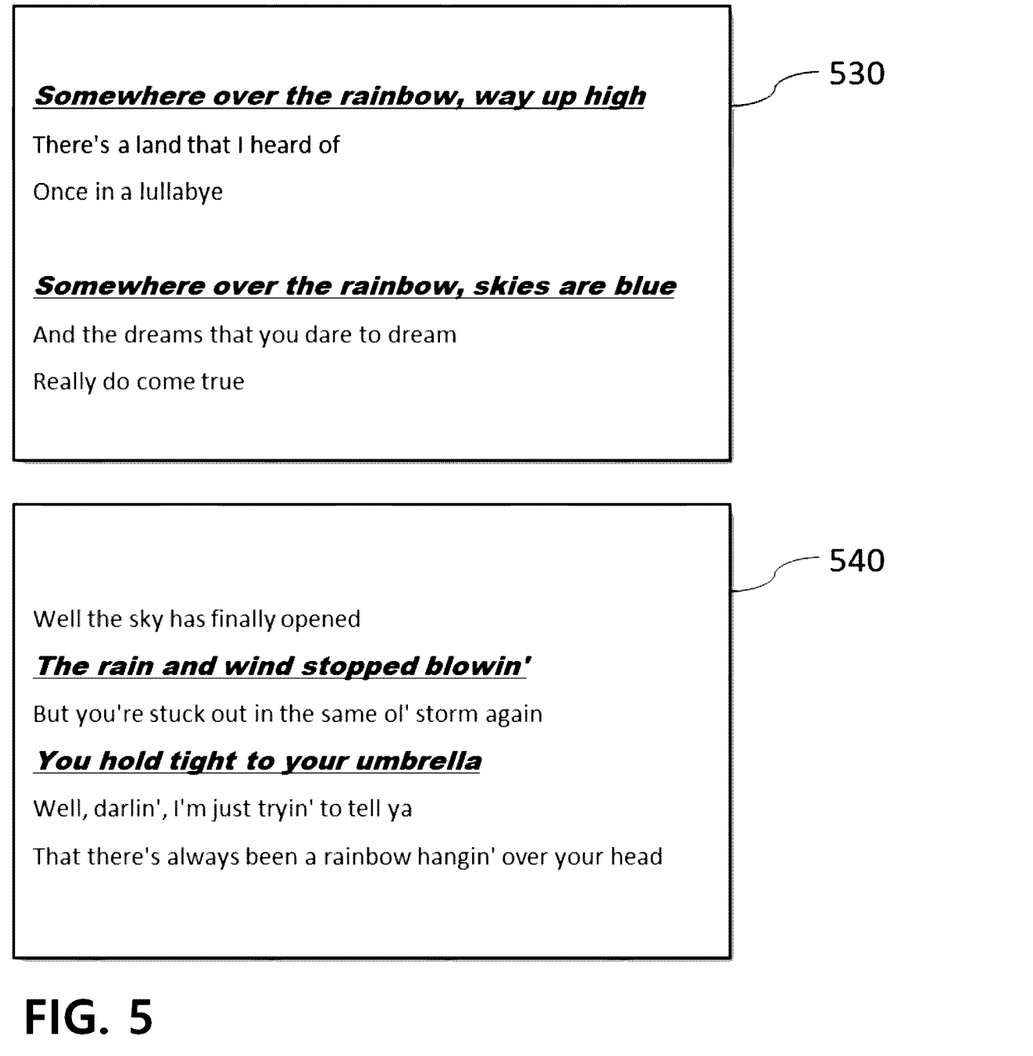
FIG. 5 is a diagram for explaining an example of a database reflecting lyrics selection information.

FIG. 5 is a diagram for explaining an example of a database reflecting lyrics selection information.

Looking at the lyrics selection information of the first music content 530, it can be seen that part of the lyrics containing "rainbow" is selected as the lyrics selection information. However, looking at the lyrics selection information of the second music content 540, it can be seen that part of the lyrics containing "rainbow" is not selected as the lyrics selection information.

The description will be made on the assumption that the recommendation apparatus 10 retrieves recommended music content using all of the lyrics as the database 14. In this case, the part containing "rainbow" among the lyrics of the second music content 540 is not selected as lyrics selection information, but the entire lyrics correspond to the database 14. In this state, when the recommendation apparatus 10 retrieves "rainbow" using the lyrics of the music content as a retrieval field, both the first and second music contents 530 and 540 are retrieved.

However, in another case, the description will be made on the assumption that the recommendation apparatus 10 retrieves recommended music content using only a portion of the lyrics selected as lyrics selection information as the database 14. In this case, the part containing "rainbow" among the lyrics of the second music content 540 is not included in the database 14. In this state, when the recommendation apparatus 10 retrieves "rainbow" in the retrieve field for lyrics of music content, the first music content 530 is retrieved, but the second music content 540 is not retrieved.

Hereinafter, another embodiment of a method for recommending music content by the recommendation apparatus 10 of the present invention will be described with reference to FIGS. 6 and 7.

Figure 6:
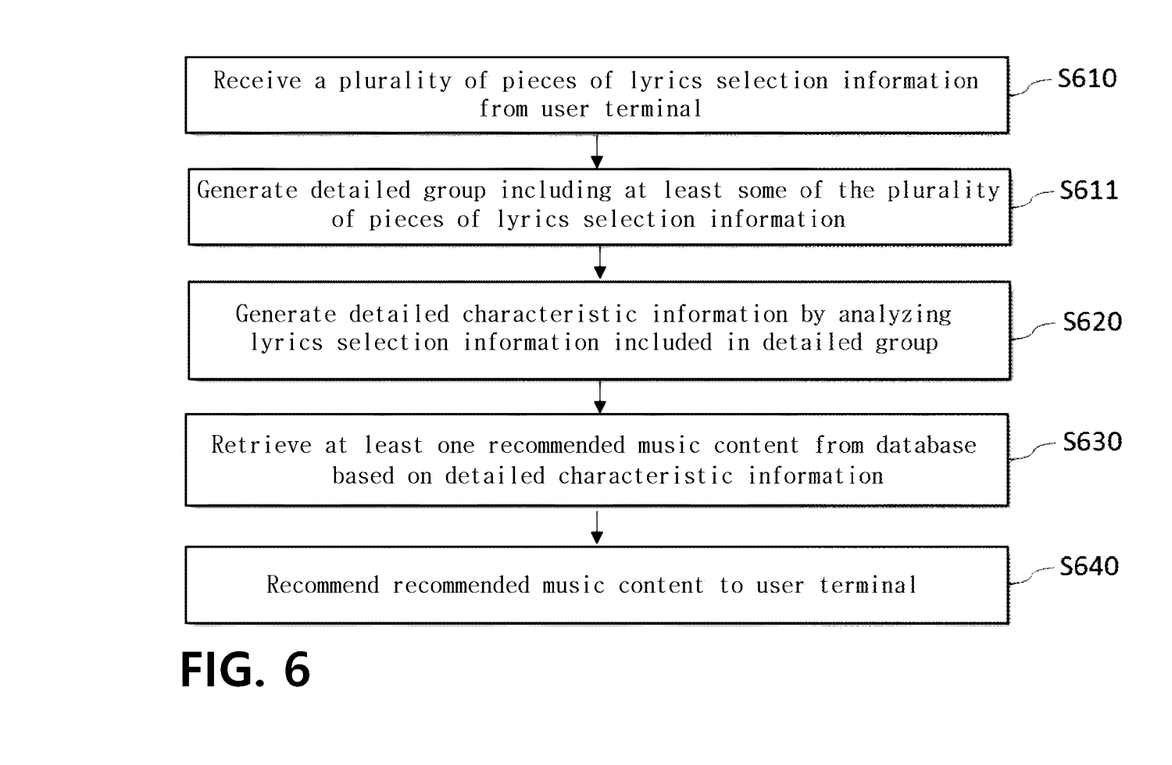
FIG. 6 is a flowchart of another exemplary embodiment of a method for recommending music content.

FIG. 6 is a flowchart of another exemplary embodiment of a method for recommending music content.

Since step S610 is the same or similar to step S210 described above, description thereof will be omitted.

In step S611, the recommendation apparatus 10 generates a detailed group including at least some of the plurality of pieces of lyrics selection information.

Here, the detailed group corresponds to a subset of the entire set if the set containing all the lyrics selection information received by the recommendation apparatus 10 in step S610 is called the entire set. That is, some or all of all the lyrics selection information may be included as elements in the detailed group. And there may be multiple different detailed groups. In some cases, there are two detailed groups with different classification criteria, but the elements of the two detailed groups may all be the same.

The recommendation apparatus 10 may generate detailed groups based on various classification criteria. The classification criteria refer to criteria for determining whether individual lyrics selection information belongs to a corresponding detailed group.

Specifically, the classification criteria may include a period including the time the lyrics selection information was generated, a situation in which the lyrics selection information was generated, a genre of the music content, a type of the music content, an artist of the music content, and a production company of the music content, etc.

For example, if generation in the last week is used as the classification criteria, a detailed group containing lyrics selection information generated over the past week may be generated. In addition, if the rainy night situation is used as classification criteria, a detailed group containing lyrics selection information generated in the rainy night situation may be generated. In addition, if the jazz genre is used as classification criteria, a detailed group containing lyrics selection information where the genre of the music content is jazz can be generated.

Here, the situation in which the lyrics selection information is generated can be collected in various ways. For example, the situation may be determined by referring to a location where the user terminal 20 is located, the Bluetooth apparatus (vehicle, earphone, etc.) connected to the user terminal 20, weather at the time the user terminal 20 generates lyrics selection information, a schedule performed by the user at the time the user terminal 20 generates lyrics selection information, an application running on the user terminal 20 at the time the user terminal 20 generates lyrics selection information, cookie information generated by the user terminal 20 at the time the user terminal 20 generates lyrics selection information, etc.

In step S620, the recommendation apparatus 10 analyzes the lyrics selection information included in the detailed group and generates detailed characteristic information.

Step S620 is similar to step S220, but differs in that detailed characteristic information is generated by analyzing lyrics selection information included in a detailed group rather than all the lyrics selection information.

Detailed characteristic information refers to characteristic information generated based on lyrics selection information included in the corresponding detailed group. Therefore, when multiple detailed groups are generated in one account information, multiple detailed characteristic information may be generated. The specific method of generating detailed characteristic information is the same as the method of generating the characteristic information described above.

Since detailed characteristic information is generated based on lyrics selection information classified based on classification criteria, it may reflect more distinct characteristics than characteristic information. For example, a case where the detailed group is one that classifies lyrics selection information generated in a rainy night situation will be described. In this case, the user would likely have selected lyrics related to the situation of a rainy night. For example, the user may have selected lyrics containing keywords such as "rain", "longing", and "memories". Because these keywords have much in common with regard to the content and mood of the lyrics, detailed characteristic information that more clearly reflects these characteristics may be generated.

In step S630, the recommendation apparatus 10 retrieves at least one recommended music content from the database 14 based on the detailed characteristic information.

Step S630 is similar to step S230, but differs in that recommended music content is retrieved from the database 14 based on detailed characteristic information rather than characteristic information.

In step S640, the recommendation apparatus 10 recommends recommended music content to the user terminal 20.

Step S640 is similar to step S240.

In step S640, the recommendation apparatus 10 may recommend recommended music content according to the situation of the user terminal 20. Specifically, when the situation criteria used as classification criteria when generating a detailed group and the current situation of the user terminal 20 are the same or similar, the recommendation apparatus 10 may recommend recommended music content retrieved based on the corresponding detailed group.

For example, the description will be made on the assumption that the situation in which the user terminal 20 is currently located is a rainy night. In this case, the recommendation apparatus 10 may recommend recommended music content retrieved based on the situation of a rainy night.

Specifically, the recommendation apparatus 10 may be in a state in which the user terminal 20 has received a plurality of pieces of lyrics selection information selected in the same situation as a rainy night in the past. The recommendation apparatus 10 may generate, or may have already generated, detailed groups according to the classification criteria of rainy night. And the recommendation apparatus 10 may generate, or may have already generated, detailed characteristic information based on these detailed groups. The recommendation apparatus 10 may recommend recommended music content retrieved based on such detailed characteristic information to the user terminal 20.

As such, the method of recommending recommended music content retrieved based on detailed characteristic information has an advantage of being able to recommend more accurate music content according to the current situation of the user terminal 20.

Figure 7:
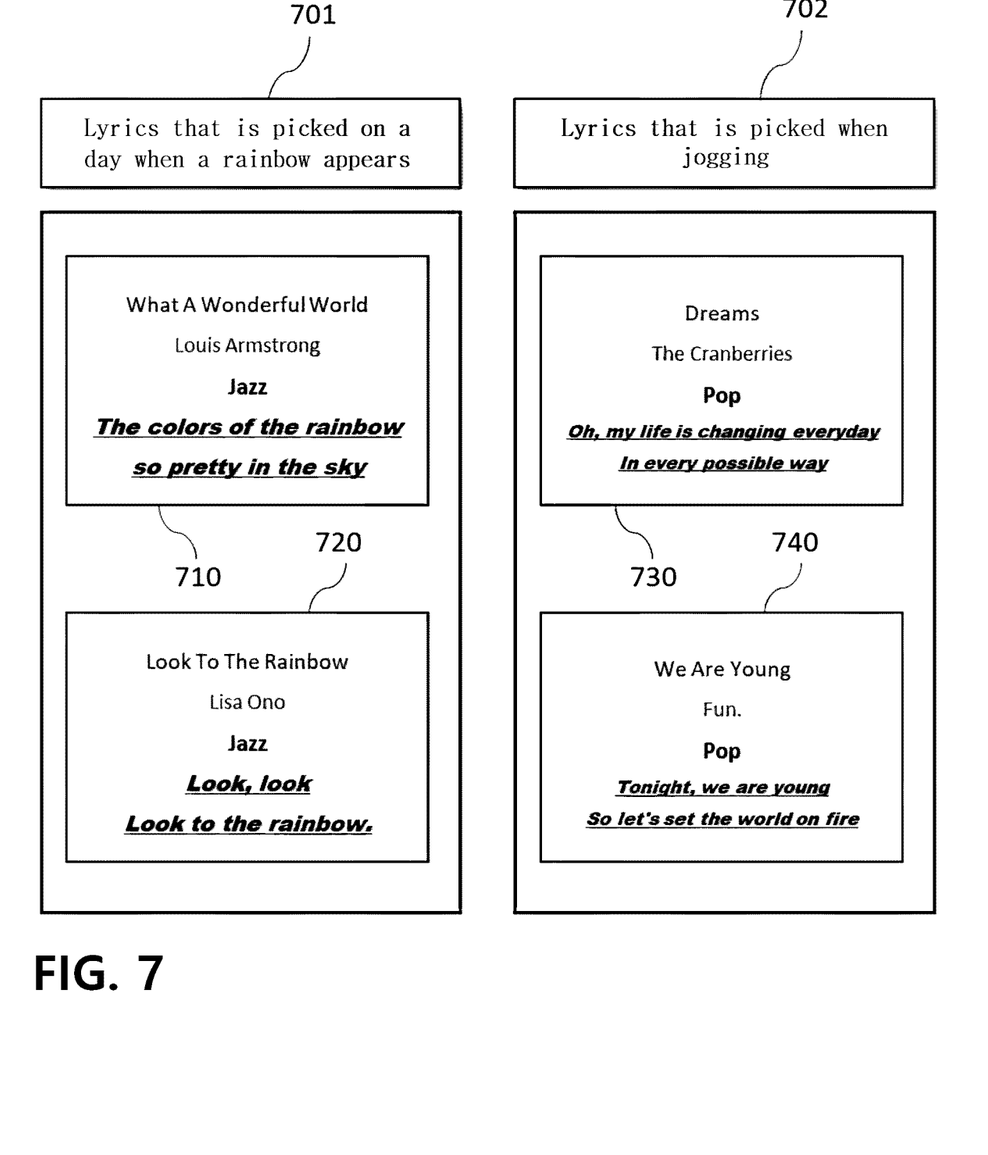
FIG. 7 shows an example in which a plurality of pieces of lyrics selection information is divided into a plurality of detailed groups.

FIG. 7 shows an example in which a plurality of pieces of lyrics selection information is divided into a plurality of detailed groups.

In FIG. 7, the description will be made on the assumption that the first and second lyrics selection information 710 and 720 is generated on a day when a rainbow appears, and the third and fourth lyrics selection information 730 and 740 is generated while the user is jogging.

If so, the recommendation apparatus 10 may group the first and second lyrics selection information 710 and 720 into the first detailed group 701. And, it may group the third and fourth lyrics selection information 730 and 740 into the second detailed group 702.

And, if the recommendation apparatus 10 determines that the current situation in which the user terminal 20 is placed is a jogging situation, the recommendation apparatus 10 may recommend recommended music found based on the second detailed group 702 to the user.

Referring to FIG. 7, another embodiment of a method for recommending music content will be described.

The recommendation apparatus 10 may provide the generation result of the detailed groups to the user terminal 20, as shown in FIG. 7. And, the user terminal 20 may receive an input of an interaction for the user to select one of the detailed groups. This user selection information may be provided to the recommendation apparatus 10. The recommendation apparatus 10 may recommend music content based on the user's detailed group selection information received in this way.

For example, as shown in FIG. 7, the user terminal 20 may output information on the first and second detailed groups 701 and 702 according to the situation. In this situation, when the user selects the second detailed group 702, the recommendation apparatus 10 may recommend music content that meets the situation criteria of the second detailed group 702.

Using this method, there is an advantage in that optimal music content can be recommended according to the user's situation.

Hereinafter, yet another embodiment of a method for recommending music content by the recommendation apparatus 10 of the present invention will be described with reference to FIGS. 8 and 9.

Figure 8:
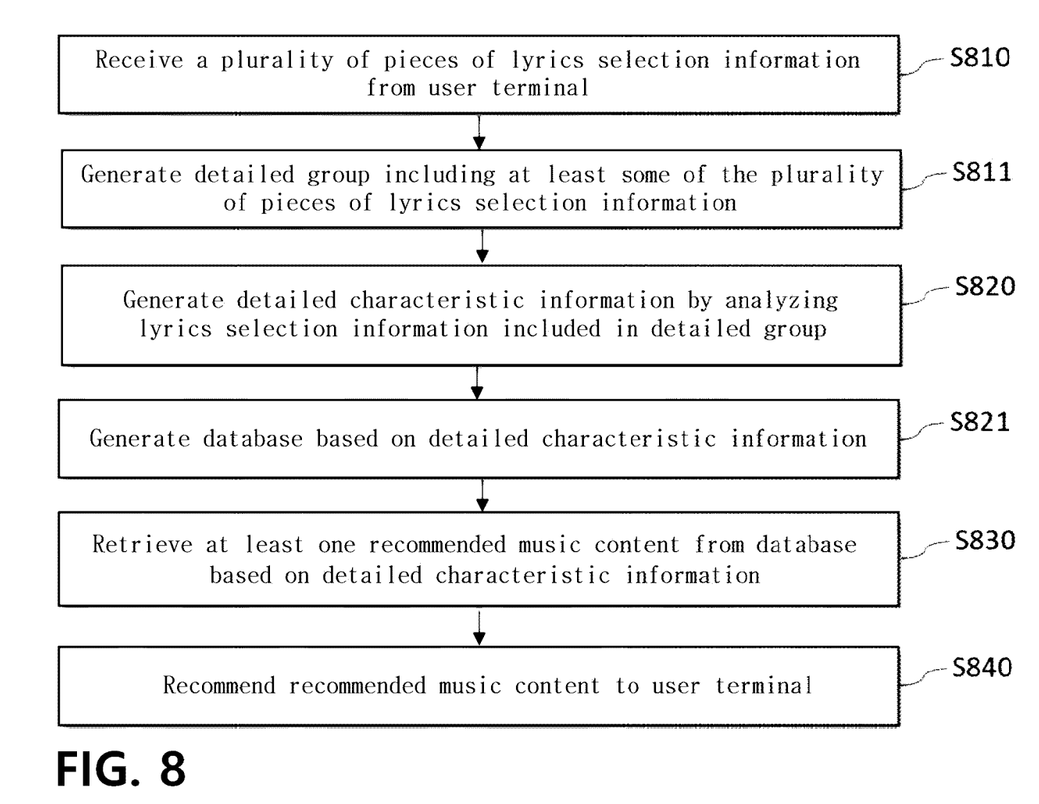
FIG. 8 is a flowchart of yet another exemplary embodiment of a method for recommending music content.

FIG. 8 is a flowchart of yet another exemplary embodiment of a method for recommending music content.

Steps S810, S811, S820, and S840 are the same as or similar to the above-described steps S610. S611, S620 and S640 respectively, and thus descriptions thereof will be omitted.

In step S821, the recommendation apparatus 10 may generate a database 14 based on the classification criteria of the detailed group.

Here, the generated database may be one that is edited or extracted from an existing original database based on the classification criteria of the detailed group.

For example, assume that the classification criteria for a detailed group generated in step S820 relate to a jogging situation. In this case, the recommendation apparatus 10 may generate a new customized database by separately extracting music contents related to the jogging situation from the original database.

Specifically, the recommendation apparatus 10 may generate a database based on lyrics selection information received from other terminal 30, not the user terminal 20. For example, it is a method that when the recommendation apparatus 10 wants to generate a database related to a jogging situation, the database is generated based on lyrics selection information generated in the jogging situation by other user of other terminal 30.

Figure 9:
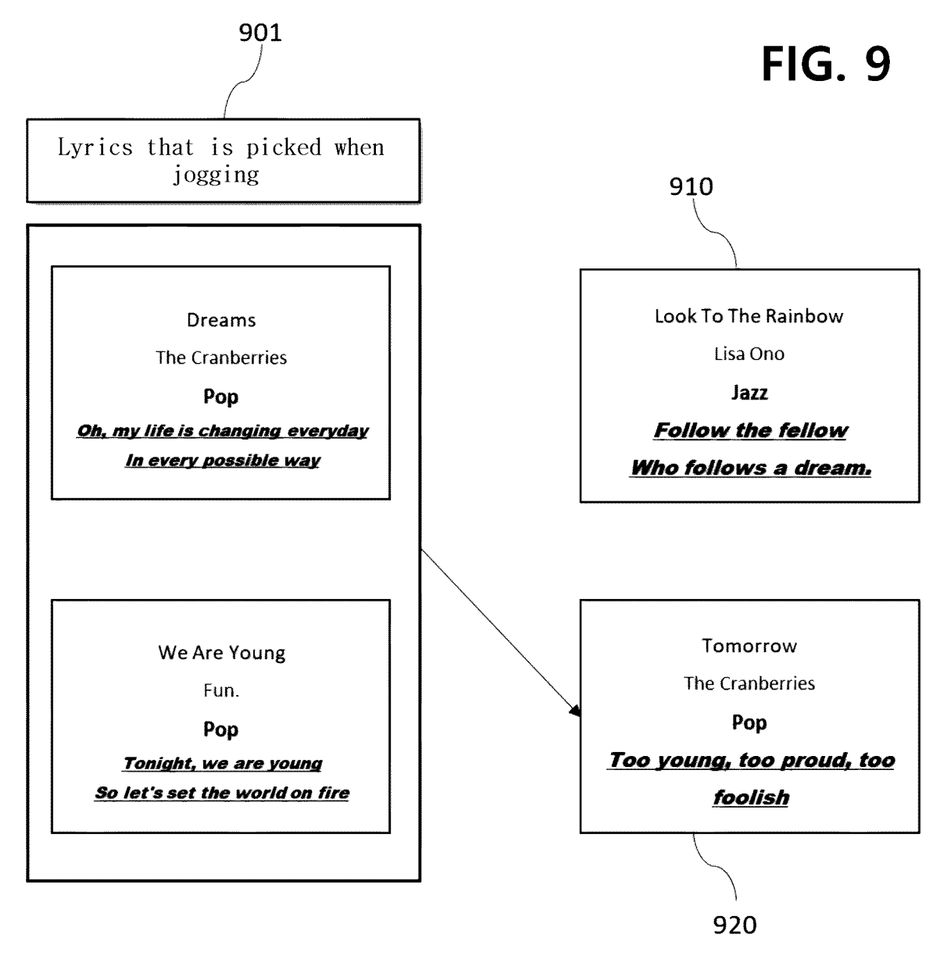
FIG. 9 shows an example in which a recommendation apparatus recommends music content.

FIG. 9 illustrates an example of recommending music content according to the embodiment described with reference to FIG. 8.

As shown in FIG. 9, it is assumed that at least some of the lyrics selection information received from the user terminal 20 is grouped into a detailed group 901 related to the jogging situation.

The recommendation apparatus 10 may analyze the lyrics content of the detailed group 901 and generate detailed characteristic information related to the keywords "vitality." "youth," and "positivity" (S820).

Then, the recommendation apparatus 10 may generate a database based on situation information corresponding to the classification criteria of the detailed group (S821). That is, the recommendation apparatus 10 may generate a new database suitable for the jogging situation from the original database.

For example, it is assumed that there were no cases where other users selected lyrics in a jogging situation for the first music content 910, but there were multiple cases where other users selected lyrics in a jogging situation for the second music content 920. In this case, the recommendation apparatus 10 may include the second music content 920 in the new database and exclude the first music content 910 from the new database.

It is assumed that the recommendation apparatus 10 retrieved recommended music content from the original database based on the keywords "vitality." "youth," and "positivity," which are detailed characteristic information, and the first music content 910 and the second music content 920 were retrieved. However, in the above-described situation, if the recommendation apparatus 10 retrieves recommended music content from the new database rather than the original database, only the second music content 920 will be retrieved.

In the embodiment described with reference to FIGS. 8 and 9, it was described that when generating a new database, the recommendation apparatus 10 generates a database based on classification criteria for detailed groups.

However, in some cases, the recommendation apparatus 10 may generate a database 14 based on other information. For example, it may obtain account information of the user terminal 20 and generate a database based on the obtained account information.

For example, assume that the user of the user terminal 20 selected jazz as his music taste in his account information. In this case, when the recommendation apparatus 10 generates a new database from the original database, the new database may be generated based on lyrics selection information generated by other user of other terminal 30 whose music taste is selected as jazz.

The account information used here may include age group, gender, activity area, hobbies, etc. in addition to the music taste described above.

This method of generating a customized database and recommending music content using it has the advantage of being able to recommend optimal music content suited to the user's situation using information selected by other users.

In describing the generation of a customized database, it was described that the recommendation apparatus 10 generates the customized database. However, in some cases, it is also possible for an entity other than the recommendation apparatus 10 to generate a customized database, and the recommendation apparatus 10 to recommend music content by accessing the customized database thus generated.

Although not shown in the drawings, characteristic information or detailed characteristic information generated by the above-described embodiments can be used in various situations. Since the characteristic information or detailed characteristic information is information that reflects the lyrics taste information of the user of the user terminal 20, it may be used to provide customized information to the user terminal 20.

For example, characteristic information or detailed characteristic information may be used when the user terminal 20 performs a retrieval.

The recommendation apparatus 10 may receive a request to retrieve music content from the user terminal 20. Here, the retrieval request may include not only retrieving lyrics, but also retrieving the title, retrieving the artist, etc. The recommendation apparatus 10 may prepare a retrieval result including recommended music content in response to the retrieval request and provide the retrieval result to the user terminal 20.

In this case, the recommendation apparatus 10 may provide retrieval results to the user terminal 20 while improving the exposure priority of recommended music content selected based on characteristic information or detailed characteristic information.

Accordingly, the recommendation apparatus 10 can provide music content that satisfies the retrieval request and provide customized information tailored to the user's lyrics taste.

In the above-described embodiments, various natural language processing methods can be used in the process of analyzing lyrics selection information and generating characteristic information or detailed characteristic information. For example, word2vec, LDA (Latent Dirichlet Allocation), or TF-IDF methods, or the like may be used.

Figure 10:
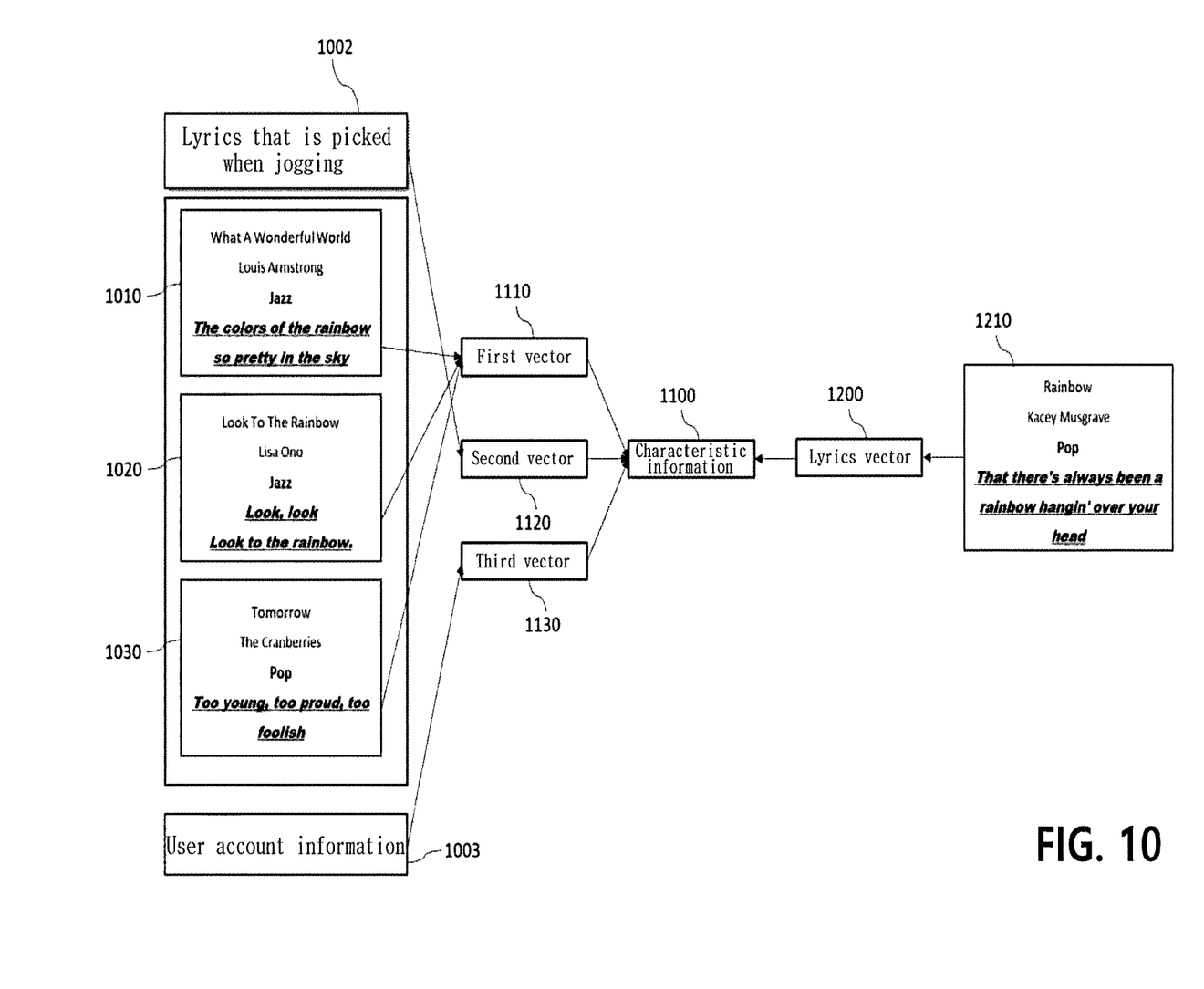
FIG. 10 shows an example in which a recommendation apparatus recommends music content.

Hereinafter, yet another embodiment of a method for recommending music content by the recommendation apparatus 10 using the word2vec method will be described with reference to FIG. 10.

The word2vec method is a method of embedding words in a vector space and expressing the words as vectors. Through this method, words that are semantically related can be extracted from various words. Detailed description of the word2vec method will be omitted.

In the present invention, when the recommendation apparatus 10 generates characteristic information or detailed characteristic information, the recommendation apparatus 10 may generate the characteristic information or detailed characteristic information by reflecting the vector generated by the word2vec method.

Specifically, the recommendation apparatus 10 may generate a first vector 1110 based on at least some of the lyrics selected from the lyrics selection information 1010, 1020, and 1030. In addition, the recommendation apparatus 10 may generate a second vector 1120 based on the situation 1002 in which lyrics selection information is generated. In addition, the recommendation apparatus 10 may generate a third vector 1130 based on the account information 1003 of the user terminal 20.

The recommendation apparatus 10 may generate characteristic information 1100 or detailed characteristic information by reflecting at least some of the first vector 1110, second vector 1120, and third vector 1130. When the characteristic information 1100 or detailed characteristic information is generated by reflecting two or more vectors together, the two or more vectors may be calculated with each other and reflected in the characteristic information 1100 or detailed characteristic information.

In selecting at least some of the first vector 1110, the second vector 1120, and the third vector 1130 to be reflected to generate the above-described characteristic information 1100 or detailed characteristic information, importance depending on the type of vector may be reflected. Specifically, in the case of the first vector 1110, it is based on the lyrics themselves in the lyrics selection information, so the importance may be the highest. And, in some cases, when reflecting each vector in the characteristic information 1100 or detailed characteristic information, a weight according to importance may be applied.

The characteristic information 1100 and the detailed characteristic information generated by reflecting at least one vector are compared with a lyrics vector 1200 of the music content stored in the database to retrieve recommended music content. The characteristic information 1100 and detailed characteristic information may be compared with the genre vector, music type vector, artist vector, etc. of the music content in addition to the lyrics vector 1200 of the music content.

Using this word2vec method, characteristic information or detailed characteristic information can be generated, and recommended music content can be retrieved. This method has an advantage that as training data increases, the model becomes more sophisticated, and retrieval performance improves accordingly.

Above, the method for recommending music content has been explained. According to the method for recommending music content of the present invention, there is an advantage in that optimal recommended music content can be retrieved and recommended based on lyrics selection information input by the user.

The technical features disclosed in each embodiment of the present invention are not limited to the corresponding embodiment, and unless incompatible with each other, the technical features disclosed in each embodiment may be merged and applied to other embodiments.

Therefore, in each embodiment, each technical feature is mainly described, but each technical feature may be merged and applied unless they are incompatible with each other.

The present invention is not limited to the above-described embodiments and accompanying drawings, and various modifications and variations will be possible from the viewpoint of those skilled in the art to which the present invention belongs. Therefore, the scope of the present invention should be defined by not only the claims of this specification but also those equivalent to these claims.

What is claimed is:

1. A method for recommending music content by a recommendation apparatus, the method comprising:
    receiving first lyrics selection information from a user terminal, the first lyrics selection information comprising at least one piece of the whole lyrics selected by the user terminal;
    generating first characteristic information by analyzing the first lyrics selection information;
    retrieving recommended music content from a database based on the first characteristic information; and
    recommending the recommended music content to the user terminal,
    wherein the database is generated based on second lyrics selection information, the second lyrics selection information comprising at least one piece of the whole lyrics selected by other terminals,
    wherein the recommended music content is determined based at least on accuracy and similarity between the first characteristic information and second characteristic information of the second lyrics selection information, the determination not being based on whole lyrics,
    wherein each of the first characteristic information and the second characteristic information is generated based on at least one of keywords, content, mood, type of language, or tone extracted from the corresponding piece of lyrics.

2. The method for recommending music content of claim 1, further comprising:
    generating a detailed group including at least some of the first lyrics selection information,
    wherein in the generating the first characteristic information, the recommendation apparatus generates detailed characteristic information by analyzing the first lyrics selection information included in the detailed group, and
    wherein in the retrieving, the recommendation apparatus retrieves at least one recommended music content from the database based on the detailed characteristic information.

3. The method for recommending music content of claim 2,
    wherein in the generating the detailed group,
    the recommendation apparatus is configured to generate the detailed group based on classification criteria corresponding to at least one of a period including the time the first lyrics selection information was generated, a situation in which the first lyrics selection information was generated, a genre of the music content, a type of the music content, an artist of the music content, and a production company of the music content.

4. The method for recommending music content of claim 2,
wherein in the generating the detailed group,
the recommendation apparatus is configured to generate the detailed group based on predetermined classification criteria, and
wherein the database is generated based further on the classification criteria.

5. The method for recommending music content of claim 2,
wherein in the generating the detailed group,
the recommendation apparatus is configured to generate the detailed group by classifying the situation in which the first lyrics selection information was generated based on situation criteria, the situation criteria being predetermined and classified conditions related to the environment determinable by the user terminal at the time the first lyrics selection information was generated, and
wherein the recommending is performed when the situation of the user terminal corresponds to the situation criteria.

6. The method for recommending music content of claim 2,
wherein in the generating the detailed group,
the recommendation apparatus is configured to generate a plurality of detailed groups, and
the method further comprising: providing a generation result of the plurality of detailed groups to the user terminal.

7. The method for recommending music content of claim 6,
wherein when the recommendation apparatus is configured to receive information selecting one of the plurality of detailed groups from the user terminal,
in the recommending,
the recommendation apparatus is configured to recommend music content based further on the one of the detailed groups.

8. The method for recommending music content of claim 1,
further comprising: obtaining account information of the user terminal,
wherein in the database, the other terminals are selected according to the same or similar criteria predetermined based on the account information.

9. The method for recommending music content of claim 1, further comprising:
receiving a request for retrieving music content from the user terminal; and
preparing retrieval results including the recommended music content in response to the retrieval request,
wherein in the recommending,
the recommendation apparatus is configured to provide the exposure priority of the recommended music content while providing the retrieval results to the user terminal.

10. The method for recommending music content of claim 1, wherein the generating first characteristic information comprises:
generating a first vector based on at least some of the first lyrics selection information,
wherein the first characteristic information comprises the first vector, and wherein the retrieving comprises:
retrieving the recommended music content by comparing the first vector with a lyrics vector of the music content included in the database.

11. The method for recommending music content of claim 10, wherein the generating first characteristic information comprises:
generating a second vector based on the situation in which the first lyrics selection information was generated, and
wherein the first characteristic information comprises the first vector and second vector.

12. The method for recommending music content of claim 10, wherein the generating first characteristic information comprises:
generating a third vector based on the account information of the user terminal, and
wherein the characteristic information comprises the first vector and third vector.

13. A non-transitory storage medium storing a computer program, when executed by at least a processor to perform the method of claim 1.

14. An apparatus for recommending music content, comprising:
a memory; and
a processor connected to the memory and configured to execute instructions contained in the memory,
wherein the processor is configured to control to:
receive first lyrics selection information from a user terminal, the first lyrics selection information comprising at least one piece of the whole lyrics selected by the user terminal,
generate first characteristic information by analyzing the first lyrics selection information,
retrieve recommended music content from a database based on the first characteristic information, and
recommend the recommended music content to the user terminal,
wherein the database is generated based on second lyrics selection information, the second lyrics selection information comprising at least one piece of the whole lyrics selected by other terminals,
wherein the recommended music content is determined based at least on accuracy and similarity between the first characteristic information and second characteristic information of the second lyrics selection information, the determination not being based on whole lyrics,
wherein each of the first characteristic information and the second characteristic information is generated based on at least one of keywords, content, mood, type of language, or tone extracted from the corresponding piece of lyrics.

\* \* \* \* \*